United States Patent [19]
Liedenbaum

[11] Patent Number: 6,144,165
[45] Date of Patent: Nov. 7, 2000

[54] ORGANIC ELECTROLUMINESCENT DEVICE

[75] Inventor: Coen Th. H. F. Liedenbaum, Eindhoven, Netherlands

[73] Assignee: U.S. Philips Corporation, New York, N.Y.

[21] Appl. No.: 09/244,210

[22] Filed: Feb. 4, 1999

[30] Foreign Application Priority Data

Feb. 6, 1998 [EP] European Pat. Off. .............. 98200360

[51] Int. Cl.[7] .................................................. G05G 3/10
[52] U.S. Cl. .................................. 315/169.3; 315/169.1; 315/291
[58] Field of Search ............................. 315/169.1, 169.2, 315/169.3, 169.4, 504, 506; 345/82; 313/504, 506, 291

[56] References Cited

U.S. PATENT DOCUMENTS

| | | | |
|---|---|---|---|
| 3,673,572 | 6/1972 | Sliva et al. | 340/166 EL |
| 4,035,774 | 7/1977 | Chang | 340/166 EL |
| 5,523,555 | 6/1996 | Friend et al. | 250/214 R |
| 5,578,814 | 11/1996 | Dadali et al. | 250/208.1 |
| 5,593,788 | 1/1997 | Shi et al. | 428/690 |
| 5,719,589 | 2/1998 | Norman et al. | 345/82 |
| 5,923,309 | 7/1999 | Ishizuka et al. | 345/82 |
| 5,990,629 | 11/1999 | Yamada et al. | 315/169.3 |
| 6,008,588 | 12/1999 | Fujii | 315/169.3 |

FOREIGN PATENT DOCUMENTS

9636959A2  11/1996  WIPO .

*Primary Examiner*—Don Wong
*Assistant Examiner*—Tuyet Vo
*Attorney, Agent, or Firm*—John C. Fox

[57] ABSTRACT

Electroluminescent device having an active layer of an electroluminescent material situated between two patterns of electrodes at least one of which is transparent to light emitted by the active layer, one of the patterns comprising a material for injecting charge carriers for emission a control for supplying bias voltage across a part of the active layer or setting bias current through the part of the active layer, means for applying a voltage in the reverse direction across part of the active layer, for measuring current associated with voltage applied in the reverse direction and for varying bias voltage or current depending on the measured current value.

6 Claims, 2 Drawing Sheets

ORGANIC ELECTROLUMINESCENT DEVICE

BACKGROUND OF THE INVENTION

The invention relates to an electroluminescent device comprising a layer of an electroluminescent material with an active layer of an organic material, which layer is situated between a first and a second pattern of electrodes, at least one of the two patterns being transparent to light to be emitted by the active layer, and a first pattern comprising a material which can suitably be used to inject charge carriers by applying a bias voltage or bias current for emitting, and said device comprising a control unit for applying the bias voltage across a part of the active layer or for setting the bias current through a part of the active layer.

The invention further relates to a display device comprising such an electroluminescent device.

Electroluminescent (EL) devices may be used as illumination sources and, for example, in displays and indicator lamps. For the active layer in such structures use is increasingly being made of organic materials, such as semiconducting organic polymers. This increases the number of possible materials for use in this type of devices.

The active layer and the two electrode layers may jointly constitute one light-emitting diode (LED), but the electroluminescent device preferably comprises a number of LEDs, for example in the form of segmented light-emitting surfaces or light-emitting surfaces arranged in the form of a matrix, as intended for a display device as described, for example, in WO 96/36959 (PHN 15.320), or combinations thereof.

The operation is based on the recombinations of electron-hole pairs which are injected in the semiconductor material (during operation in the forward direction) from electrodes located on either side of the active layer. Due to these recombinations, energy in the form of (visible) light is released, which is a phenomenon referred to as electroluminescence. The wavelength and hence the color of the emitted light is also determined by the band gap of the (semiconductor) material.

Dependent upon the way in which the electroluminescent device is used, problems occur typically when this type of display devices is used in varying ambient light conditions.

For example, when such a display device is used in "automotive" display devices (motor vehicles), it must not dazzle in the dark, but, on the other hand, its light output in daylight must be sufficient to ensure a satisfactory degree of readability. Such display devices are generally of the so-called negative type (combination of a transmissive LCD and an LED-backlight, direct emitting electroluminescent display devices). Application in so-called positive-type display devices (a combination of a transflective LCD and an LED-backlight), such as widely used in portable telephones, requires, however, an additional light source in the dark to ensure a sufficient degree of readability.

SUMMARY OF THE INVENTION

One of the objects of the present invention is to obviate one or more of the above-mentioned drawbacks.

To achieve this, an electroluminescent device in accordance with the invention is characterized in that the control unit comprises means for applying a voltage across a part of the active layer, for measuring the associated current value, and, dependent upon said measured current value, for varying the bias voltage or bias current.

Preferably, the associated current value is measured upon applying a voltage across a part of the active layer in the reverse direction.

The invention is based on the realization that, in particular, yet not exclusively during operation in the reverse direction, the electroluminescent device supplies a photocurrent, which is an indication of the quantity of incident light. The photocurrent can be measured, in a generally known manner, as the reverse current, which is generated by incident light, when a light-sensitive diode, in this case the diode formed by the active layers, is reverse-biased (or, for example, at a voltage in the forward direction below the so-called threshold voltage).

The bias voltage or bias current can be set in various ways, for example as a direct voltage (current) but also as an alternating voltage (via frequency or pulse modulation).

The photocurrent can be measured once, for example when the display device or the device (for example a mobile telephone) in which it is incorporated is put into operation. In the case of prolonged use, for example when the electroluminescent device serves as an illumination source (backlight) for a (liquid crystal) display device, the photocurrent is preferably measured repetitively, so that a continuous adaptation to the ambient light is possible. Preferably, the measurement is averaged over the surface of the display device by measuring the photocurrent at a number of locations (particularly in the case of relatively large surface areas).

To carry out photocurrent measurements, connections already present in an electroluminescent element may be employed, so that no additional connections are required.

These and other aspects of the invention will be apparent from and elucidated with reference to the embodiments described hereinafter.

BRIEF DESCRIPTION OF THE DRAWINGS

In the drawings:

FIG. 2 is a schematic, sectional view of a part of another display device in accordance the invention, FIG. 3 schematically shows an equivalent-circuit diagram of a display device in accordance with the invention, while

The Figures are diagrammatic and not drawn to scale. Corresponding elements are generally denoted by the same reference numerals.

DESCRIPTION OF THE PREFERRED EMBODIMENTS

Figure 1:
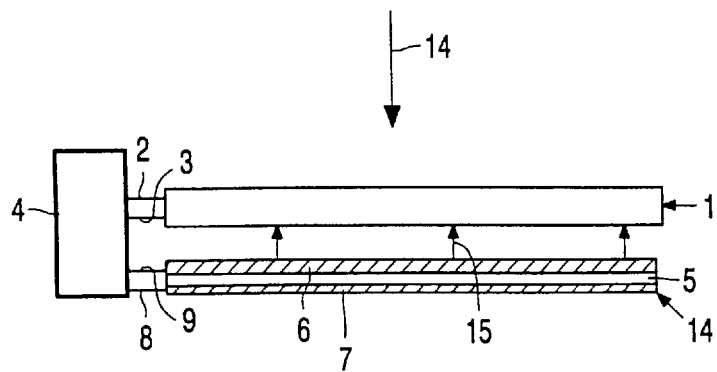
FIG. 1 is a schematic, sectional view of a part of a display device in accordance with the invention.

FIG. 1 is a cross-sectional view of a part of a display device which is composed of a display panel 1 which operates in transmission, for example a liquid crystal display panel, which is controlled from a control unit 4 via control lines 2, 3. The control unit 4 may provide, for example, video information but also information about an apparatus which comprises the display panel, such as a mobile telephone, a board computer in automotive applications or a measuring instrument.

The display panel 1 modulates light originating from a light source (backlight) 14, thereby making visible the information to be displayed.

The light source 14 comprises an active layer 5 which is sandwiched between two electrode layers 6, 7 of electro-conductive materials. The active layer may comprise a polymeric material or a low-molecular organic material (OLEDs), which material is generally applied by vapor deposition.

In this manner, the intermediate active material is used to form a light-emitting diode (LED) 14. The light source 14 emits light transversely to the surface of the active layer 5, as schematically indicated by means of arrows 15. The electrode 6 is transparent to the emitted light in the active layer. During operation, the electrode 6 is driven, via control line 9, in such a way that it is at a sufficiently positive voltage relative to the electrode 7 to inject holes in the active layer. The material of this electrode 6 has a high work function and is generally formed by a layer of indium oxide or indium tin oxide (ITO). Particularly ITO is suitable owing to its good electrical conductance and high transparency. Relative to the electrode 6, the electrode 7 serves as a negative electrode to inject electrons in the active layer. In this example, the material used for this layer is aluminium, but, alternatively, a material having a low work function, such as indium, calcium, barium or magnesium may be used for this layer. The layers may also be provided in the reverse order.

The light intensity of the source 14 depends on the forward voltage. Dependent upon the type of application, it is desirable to adapt this forward voltage to the light intensity of the ambient light, as indicated in FIG. 1 by arrows 15. For example, in the case of applications in automobiles, the light intensity of the source 14 (and hence the forward voltage across the electroluminescent element) must increase if the light intensity of the ambient light increases and the light intensity must decrease, for reasons relating to danger of dazzle, when the light intensity of the ambient light decreases.

In accordance with the invention, the intensity of ambient light is determined (once or continually) by measuring the photocurrent through the electroluminescent device (the organic LED), preferably in the reverse direction (reverse bias). Measurements at a voltage in the forward direction (at a voltage below the threshold voltage) is alternatively possible.

Figure 4:
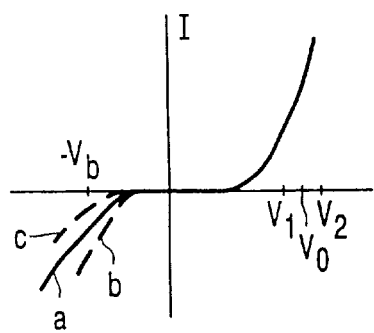
FIG. 4 shows a current-voltage characteristic of an electroluminescent element.
Figure 5:
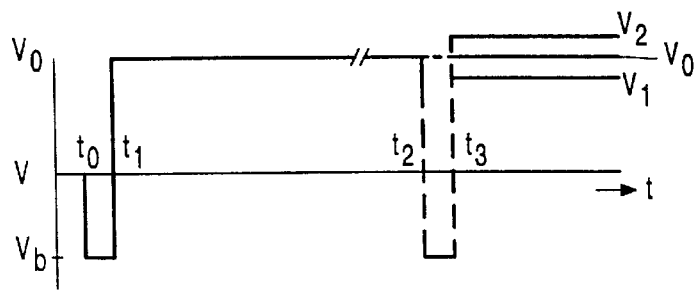

To this end, (see FIG. 5), at the instant $t_0$, a reverse voltage $-V_b$ is applied across the electroluminescent element (the LED) between the electrodes 6 and 7, and the photocurrent generated by incident light 13 is measured. The measured value is, for example, digitized in the control unit 4. The value thus obtained is subsequently used to calculate the forward voltage to be set (in this case $V_0$), which is applied from $t_1$ across the electroluminescent element (the LED). FIG. 4 shows how, at a voltage $-V_b$ across the electroluminescent element, the photocurrent generated by the incident light 13 depends upon different values of the intensity of the incident light 13 (curves a, b, c) and how the forward voltage determines the current in the forward direction and hence the intensity of the light emitted by the electroluminescent element.

In the case of applications in equipment in which the display function is useful for a short time period (for example mobile telephones), it is sufficient to set the illumination source only once. For applications in equipment in which the display function is needed for a longer time period and the intensity of the incident light varies (for example in automotive applications or organizers), the setting is periodically adjusted. To this end, at the instant $t_2$, the reverse voltage $-V_b$ is again applied across the electroluminescent element and the photocurrent generated by the incident light 13 is measured. Via the control unit 4, the measured value is used to change, if necessary, the forward voltage at the instant $t_3$, etc. Dependent upon the measured photocurrent, the bias voltage across a part of the active layer is varied.

The kind of adaptation depends upon the application. When, for example, an "organizer" embodied so as to be a "positive display", for example a transflective LCD with backlight, is used in broad daylight, it is sufficient to make the display device light up less brightly; in this case, a brighter light (photocurrent b in FIG. 4) will cause the forward bias of the electroluminescent device (backlight 14) to be set to a lower level (voltage $V_1$ in FIG. 4). In dim light or a dark environment, however, the display device must light up and the forward voltage will be set to a higher level (voltage $V_2$ in FIG. 4). When used in cars (board computer), however, the display device (customarily a "negative display", embodied so as to be a transmissive LCD with backlight or an electroluminescent display device) must not dazzle and, at a low light intensity of the ambient light, the display device must light up less brightly and the forward voltage must be set to a lower level (voltage $V_1$ in FIG. 4), while in the case of brighter ambient light, the forward voltage must be set to a higher level (voltage $V_2$ in FIG. 4).

Figure 2:
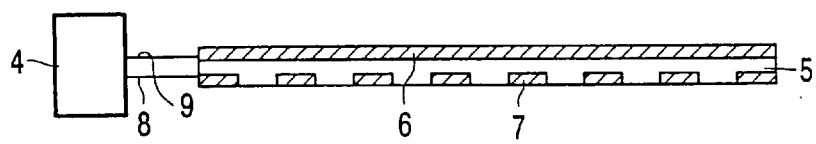

FIG. 2 shows another display device with an active layer 5 sandwiched between two patterns of electrode layers 6, 7 of electroconductive materials. In this example, the electrodes 6 form column or data electrodes, while the electrodes 7 form row or selection electrodes. In this manner, a matrix of light-emitting diodes (LEDs), also referred to as picture elements or pixels, is formed by means of the intermediate active material. At least one of the electrode patterns is transparent to the emitted light in the active layer. During operation, the column or data electrodes 6 are driven such that they are at a sufficiently high positive voltage relative to the selection electrodes 7 to inject holes in the active layer. The material of these electrodes 6 has a high work function and is generally formed by a layer of indium oxide or indium tin oxide (ITO). Particularly ITO is suitable because it exhibits a good electric conductance and a high transparency. The selection electrodes 7 serve (relative to the electrodes 6) as negative electrodes for the injection of electrons in the active layer. In this example, the material for this layer is aluminium.

Figure 3:
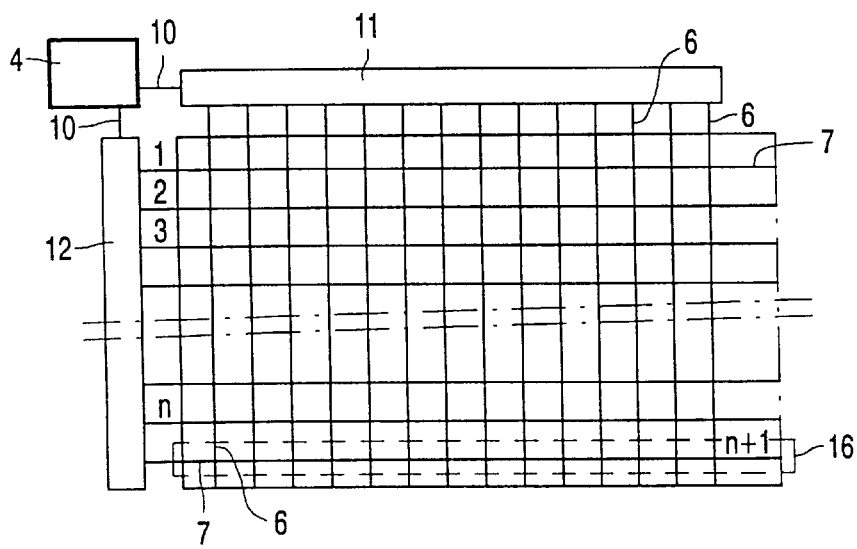

FIG. 3 schematically shows an electrical equivalent-circuit diagram of a part of a matrix of such LEDs having n rows and m columns. This device further includes a row-selection circuit 12 (for example a multiplex circuit) and a data register 11. Information presented from the exterior, for example a video signal, is processed in a control unit 4 which, dependent upon the information to be displayed, loads the individual parts of the data register. The row-selection voltages are presented by the row-selection circuit 12. Mutual synchronization between the selection of the rows and the presentation of voltages to the column electrodes 6 takes place by means of the control unit 4 via control lines 10.

Figure 6:
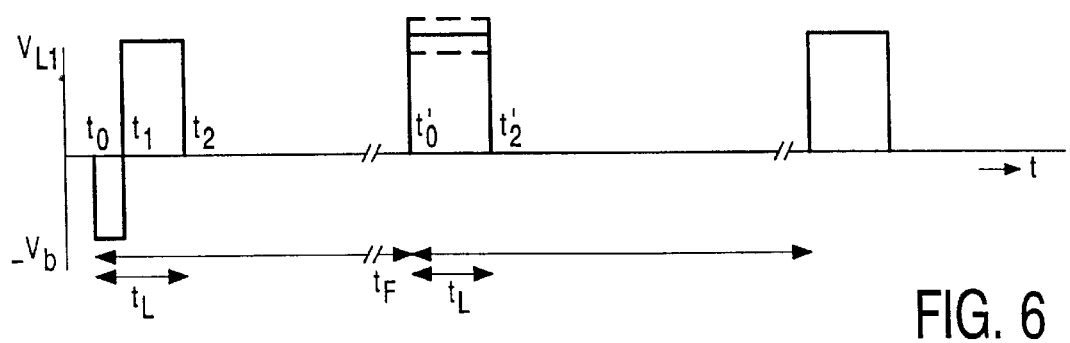
FIGS. 6 through 8 show control signals for such a device.
Figure 7:
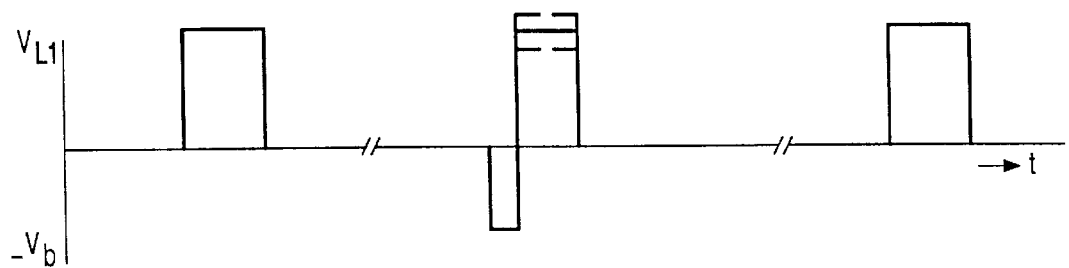
Figure 8:
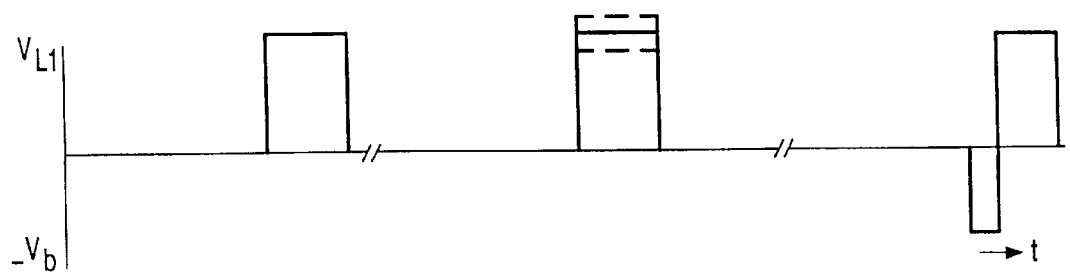

Control signals for such a device are schematically shown in FIGS. 6 through 8, which represent the row-selection signals or line-selection signals which, in the above examples, select the lines 1, 2, 3 . . . n during a selection period $t_L$ by presenting a selection voltage $V_{sel}$. During the remaining length of time, which is equal, for example, to a field time or (as in this case) a frame time $t_F$, a non-selection voltage $V_{nonsel}$ is presented.

During the frame time, the voltages presented to the column or data electrodes are such that the pixels emit light of the desired intensity.

In accordance with the invention, (in this example) during the first selection of row 1, the selection signal is set during the period $t_0$–$t_1$ such that the counter voltage $-V_b$ is applied across the electroluminescent element and the photocurrent generated by the incident light 13 is measured. To this end, the selection signal receives, for example, during a part of the selection period $t_L$ a voltage $-V_b$, while the data voltage is 0 volt. The measured value is used via the control unit 4 to change, if necessary, the desired forward voltage at the instant $t_0'$ in a subsequent frame in the manner described hereinabove. Dependent upon the measured photocurrent, the bias voltage is varied again across a part of the active layer.

By means of the pulse patterns shown in FIGS. 6 through 8, the light incident on the second row of pixels is measured during the second frame, the light incident on the third row of pixels is measured during the third frame, etc. The necessary correction can also be calculated in the control unit 4 after the photocurrent has been measured in all rows. In this example, the time between two measurements is equal to the frame time. In simpler display devices, this time may be longer.

In this way, a correction which is averaged over the surface of the display device takes place. Averaging in the column direction, or a combination, is also possible. Unlike FIG. 1, the correction does not necessarily apply to a light-source (backlight) control voltage $V_0$ to be presented, but serves to correct the selection voltage or the data voltage (which may contain a range of grey values), or both.

Also in this case, the kind of adaptation is governed by the application. If, for example, an "organizer" is used in broad daylight, brighter light (photocurrent b in FIG. 4) will cause the forward voltages of the electroluminescent device to be set to a higher level, while in a darker environment the forward voltages will be set to a lower level. For applications in cars (board computer), the pixels must emit light in the case of both a high and a low light intensity, and the forward voltages must be set to the associated levels.

In a variant of FIG. 2, an additional row (n+1) of pixels is covered with an opaque material, such as chromium (in FIG. 3 indicated by the dashed line 16). In this device, the measured photocurrent is compared by comparing it with the photocurrent of the row of pixels located beneath the chromium. The necessary correction is now determined by means of a differential measurement.

What is claimed is:

1. An electroluminescent device comprising a layer of an electroluminescent material with an active layer of an organic material, which layer is situated between a first and a second pattern of electrodes, at least one of the two patterns being transparent to light to be emitted by the active layer, and the first pattern comprising a material which can be suitably be used to inject charge carriers by applying a bias voltage or a bias current for emitting, and said device comprising a control unit for applying the bias voltage across a part of the active layer or for setting the bias current through the part of the active layer, characterized in that the control unit comprises a means for applying a voltage in the reverse direction across a part of the active layer, for measuring current value associated with the voltage applied in the reverse direction, and dependent upon said measured current value, for varying the bias voltage or bias current.

2. An electroluminescent device as claimed in claim 1, characterized in that the bias voltage is determined by means of the difference between current values measured across different parts of the active layer, one of the two parts being shielded from incident light.

3. A display device comprising an electroluminescent device as claimed in claim 1.

4. An electroluminescent device as claimed in claim 1, characterized in that the current is measured repetitively.

5. An electroluminescent device as claimed in claim 4, characterized in that the current is alternately measured across different parts of the active layer.

6. An electroluminescent device as claimed in claim 5, characterized in that the bias voltage is determined by means of the average of the current values measured across different parts of the active layer.

* * * * *